(12) United States Patent
Maniwa et al.

(10) Patent No.: US 12,034,123 B2
(45) Date of Patent: Jul. 9, 2024

(54) SOLID-STATE BATTERY

(71) Applicant: Murata Manufacturing Co., Ltd., Nagaokakyo (JP)

(72) Inventors: Takeshi Maniwa, Nagaokakyo (JP); Osamu Chikagawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 615 days.

(21) Appl. No.: 17/237,514

(22) Filed: Apr. 22, 2021

(65) Prior Publication Data

US 2021/0249696 A1 Aug. 12, 2021

Related U.S. Application Data

(63) Continuation of application No. PCT/JP2019/042171, filed on Oct. 28, 2019.

(30) Foreign Application Priority Data

Oct. 29, 2018 (JP) .................................. 2018-203155

(51) Int. Cl.
*H01M 10/0585* (2010.01)
*H01M 10/0562* (2010.01)
*H01M 50/547* (2021.01)

(52) U.S. Cl.
CPC ... *H01M 10/0585* (2013.01); *H01M 10/0562* (2013.01); *H01M 50/547* (2021.01)

(58) Field of Classification Search
CPC ......... H01M 10/0585; H01M 10/0562; H01M 50/547
See application file for complete search history.

(56) References Cited

U.S. PATENT DOCUMENTS 9,017,839 B2    4/2015   Tsuchida et al.
2003/0113621 A1* 6/2003  Shimamura ....... H01M 10/6563
                                                  429/162

(Continued)

FOREIGN PATENT DOCUMENTS

JP    2007005279 A    1/2007
JP    2009193727 A    8/2009

(Continued)

OTHER PUBLICATIONS

Written Opinion of the International Search Authority issued for PCT/JP2019/042171, date of mailing Jan. 28, 2020.

(Continued)

*Primary Examiner* — Matthew J Merkling
(74) *Attorney, Agent, or Firm* — ArentFox Schiff LLP

(57) ABSTRACT

A solid-state battery that includes: at least one battery building block including: a positive electrode layer having a positive electrode active material layer; a negative electrode layer having a negative electrode active material layer; and a solid electrolyte layer interposed between the positive electrode layer and the negative electrode layer. The positive electrode layer has a first buffer portion at or adjacent to at least one end of the positive electrode layer, the first buffer portion having a density lower than a density of the positive active material layer in portions other than the at least one end thereof, and the negative electrode layer has a second buffer portion at or adjacent to at least one end of the negative electrode layer, the second buffer portion having a density lower than a density of the negative active material layer in portions other than the at least one end thereof.

19 Claims, 18 Drawing Sheets

(56) References Cited

U.S. PATENT DOCUMENTS

| | | | |
|---|---|---|---|
| 2010/0297479 A1 | 11/2010 | Tsuchida et al. | |
| 2011/0305948 A1* | 12/2011 | Miyatake | H01M 4/668 |
| | | | 252/511 |
| 2015/0380716 A1* | 12/2015 | Zama | H01M 50/536 |
| | | | 429/211 |
| 2018/0006348 A1* | 1/2018 | Ebisuzaki | H01M 10/659 |
| 2019/0036089 A1* | 1/2019 | Koga | H01M 10/654 |

FOREIGN PATENT DOCUMENTS

| | | |
|---|---|---|
| JP | 2013243004 A | 12/2013 |
| JP | 2019139892 A | 8/2019 |
| WO | 2018123479 A1 | 5/2018 |

OTHER PUBLICATIONS

International Search Report issued for PCT/JP2019/042171, date of mailing Jan. 28, 2020.

\* cited by examiner under pressure at a first buffer portion at or adjacent to at least one end of a positive electrode active material layer, and at a second buffer portion at or adjacent to at least one end of a negative electrode active material layer.

SOLID-STATE BATTERY

CROSS REFERENCE TO RELATED APPLICATIONS

The present application is a continuation of International application No. PCT/JP2019/042171, filed Oct. 28, 2019, which claims priority to Japanese Patent Application No. 2018-203155, filed Oct. 29, 2018, the entire contents of each of which are incorporated herein by reference.

FIELD OF THE INVENTION

The present invention relates to a solid-state battery.

BACKGROUND OF THE INVENTION

Secondary batteries that can be repeatedly charged and discharged have been conventionally used in various applications. For example, secondary batteries are used as a power source for electronic devices such as smartphones and laptop computers.

In the secondary batteries, liquid electrolytes (electrolyte solutions) such as organic solvents have been conventionally used as a medium for moving ions. Secondary batteries containing an electrolyte solution, however, have a problem such as leakage of the electrolyte solution.

Therefore, solid-state batteries containing a solid electrolyte instead of a liquid electrolyte have been developed.

Patent Document 1: Japanese Patent Application Laid-Open No. 2007-005279

SUMMARY OF THE INVENTION

A solid-state battery 500' has a configuration including at least one battery building block 100' that includes a positive electrode layer 10A' and a negative electrode layer 10B' facing each other, and a solid electrolyte layer 20' interposed between the positive electrode layer 10A' and the negative electrode layer 10B', the battery building block 100' being provided in the stacking direction of layers in the solid-state battery 500' (see FIG. 7).

The positive electrode layer 10A' includes a positive electrode current collector 11A' and a positive electrode active material layer 12A', and has a configuration in which one end of the positive electrode current collector 11A' is electrically connected to a positive electrode terminal 200A'. The negative electrode layer 10B' includes a negative electrode current collector 11B' and a negative electrode active material layer 12B', and has a configuration in which one end of the negative electrode current collector 11B' is electrically connected to a negative electrode terminal 200B'. In such a configuration, in some cases, the solid electrolyte layer 20' is provided without a gap between the positive electrode layer 10A' and the negative electrode layer 10B' facing each other, and is provided in contact with an end 30' (at the side of a portion not connected to a terminal) of each of the electrode layers (see FIG. 7).

Here, it is known to those skilled in the art that during the charging of the solid-state battery 500', due to the movement of ions in the solid electrolyte between the positive electrode layer 10A' and the negative electrode layer 10B', the active material layer of each of the electrode layers may expand (see FIG. 8). When such expansion of the active material layers occurs, the following problems may occur.

Specifically, when the active material layers expand during the charging of the solid-state battery 500', the solid electrolyte layer 20' in contact with the end 30' (at the side of a portion not connected to a terminal) of each of the electrode layers does not expand. Therefore, between the end 30' (at the side of a portion not connected to a terminal) of each of the electrode layers and the solid electrolyte layer 20', stress caused by the expansion of the active material layers may be generated at the solid electrolyte layer 20' that does not expand. When such stress is generated, cracks 40' may occur at the periphery of the solid-state battery 500', specifically, the periphery of the solid electrolyte layer 20' (see FIGS. 9 and 10). The occurrence of the cracks 40' may cause infiltration of moisture or the like from the outside into the electrode layers and the solid electrolyte in the solid-state battery 500'. Therefore, ions may not properly move in the solid electrolyte between the positive electrode layer 10A' and the negative electrode layer 10B' during the charging and discharging of the solid-state battery 500'. As a result, the solid-state battery 500' may not be properly charged and discharged.

The present invention has been made in view of the above-mentioned circumstances. That is, a main object of the present invention is to provide a solid-state battery capable of being properly reduced in the occurrence of cracks in the solid electrolyte layer during the charging of the solid-state battery.

In order to achieve the above-mentioned object, in one embodiment of the present invention, a solid-state battery includes: at least one battery building block including: a positive electrode layer having a positive electrode active material layer; a negative electrode layer having a negative electrode active material layer; and a solid electrolyte layer interposed between the positive electrode layer and the negative electrode layer, the battery building block being provided in a stacking direction of layers in the solid-state battery, wherein the positive electrode layer has a first buffer portion at or adjacent to at least one end of the positive electrode layer, the first buffer portion having a density lower than a density of the positive active material layer in portions other than the at least one end of the positive electrode layer, and wherein the negative electrode layer has a second buffer portion at or adjacent to at least one end of the negative electrode layer, the second buffer portion having a density lower than a density of the negative active material layer in portions other than the at least one end of the negative electrode layer.

According to one embodiment of the present invention, it is possible to properly reduce the occurrence of cracks in the solid electrolyte layer during the charging of the solid-state battery.

DETAILED DESCRIPTION OF THE INVENTION

Figure 1A:
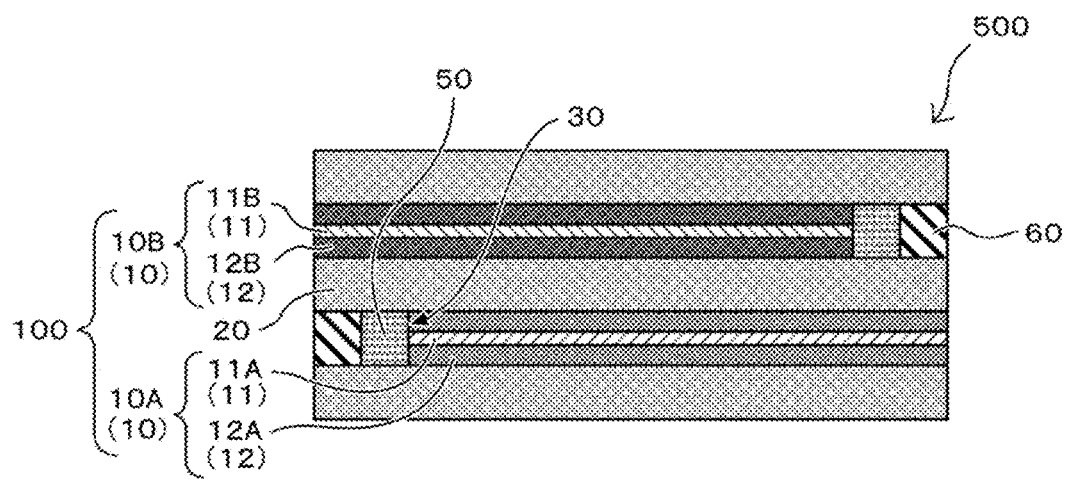
FIG. 1A is a cross-sectional view schematically illustrating a solid-state battery according to one embodiment of the present invention.

In the following, the "solid-state battery" of the present invention will be described in detail. Although the description will be given with reference to the drawings as necessary, the contents in the drawings are merely schematically shown as examples for the understanding of the present invention, and the appearance, dimensional ratio, and the like of the contents may differ from the actual ones.

The term "solid-state battery" as used herein refers to, in a broad sense, a battery whose components are made of solids, and in a narrow sense, an all-solid-state battery whose battery components (particularly preferably, all the battery components) are made of solids. In one preferred aspect, the solid-state battery in the present invention is a stacked solid-state battery in which the layers forming the battery building block are stacked on one another, and the layers are preferably each made of a sintered compact. The term "solid-state battery" encompasses not only a so-called "secondary battery" capable of being repeatedly charged and discharged, but also a "primary battery" capable of being only discharged. According to one preferred aspect of the present invention, the "solid-state battery" is a secondary battery. The term "secondary battery" may encompass, for example, a power storage device without being excessively bound by the designation.

The term "plan view" as used herein is based on the form of a subject viewed from above or below in the thickness direction of the solid-state battery, the thickness direction being determined by the stacking direction of the layers making up the solid-state battery. Further, the term "cross-sectional view" as used herein is based on the form of a subject viewed from a substantially perpendicular direction in the thickness direction of the solid-state battery, the thickness direction being determined by the stacking direction of the layers making up the solid-state battery (in short, the cross-sectional view is based on the form of a subject when the subject is cut out at a surface parallel to the thickness direction). The "vertical direction" and "horizontal direction" used directly or indirectly herein correspond to the vertical direction and horizontal direction in the drawings, respectively. Unless otherwise specified, the same reference symbols or signs indicate the same members or sites, or the same meanings. In one preferred aspect, it is understood that the vertically downward direction (that is, the direction in which gravity acts) corresponds to the "downward direction", and the direction opposite to the downward direction corresponds to the "upward direction".

Unless otherwise described, various numerical ranges mentioned herein are intended to include the very numerical values of the lower and upper limits. Specifically, for example, taking a numerical range "1 to 10" as an example, unless otherwise described, it is interpreted that the numerical range includes the lower limit "1" and also includes the upper limit "10".

[Basic Configuration of Solid-State Battery]

The solid-state battery includes at least positive and negative electrode layers and a solid electrolyte. Specifically, the solid-state battery includes a solid-state battery laminate that includes a battery building block including a positive electrode layer, a negative electrode layer, and a solid electrolyte interposed between the positive electrode layer and the negative electrode layer.

In the solid-state battery in which each layer making up the solid-state battery is formed by firing, each of the positive electrode layer, the negative electrode layer, the solid electrolyte, and the like forms a sintered layer. Preferably, all of the positive electrode layer, the negative electrode layer, and the solid electrolyte are integrally fired, and therefore the solid-state battery laminate forms an integrally sintered compact.

The positive electrode layer is an electrode layer containing at least a positive electrode active material. The positive electrode layer may further contain a solid electrolyte. For example, the positive electrode layer is made of a sintered compact containing at least positive electrode active material grains and solid electrolyte grains. In one preferred aspect, the positive electrode layer is made of a sintered compact containing substantially only positive electrode active material grains and solid electrolyte grains. Meanwhile, the negative electrode layer is an electrode layer containing at least a negative electrode active material. The negative electrode layer may further contain a solid electrolyte. For example, the negative electrode layer is made of a sintered compact containing at least negative electrode active material grains and solid electrolyte grains. In one preferred aspect, the negative electrode layer is made of a sintered compact containing substantially only negative electrode active material grains and solid electrolyte grains.

The positive electrode active material and the negative electrode active material are substances involved in the transfer of electrons in the solid-state battery. Ions move (are conducted) between the positive electrode layer and the negative electrode layer via the solid electrolyte to transfer electrons, so that the solid-state battery is charged and discharged. The positive electrode layer and the negative electrode layer are particularly preferably layers capable of storing and releasing lithium ions. In other words, the solid-state battery is preferably an all-solid-state secondary battery that is charged and discharged by the movement of lithium ions between the positive electrode layer and the negative electrode layer via the solid electrolyte.

(Positive Electrode Active Material)

The positive electrode active material contained in the positive electrode layer may be at least one material selected from the group consisting of lithium-containing phosphate compounds having a NASICON structure, lithium-containing phosphate compounds having an olivine structure, lithium-containing layered oxides, lithium-containing oxides having a spinel structure, and the like. Examples of the lithium-containing phosphate compounds having a NASICON structure include $Li_3V_2(PO_4)_3$. Examples of the lithium-containing phosphate compounds having an olivine structure include $LiFePO_4$ and $LiMnPO_4$. Examples of the lithium-containing layered oxides include $LiCoO_2$ and $LiCo_{1/3}Ni_{1/3}Mn_{1/3}O_2$. Examples of the lithium-containing oxides having a spinel structure include $LiMn_2O_4$ and $LiNi_{0.5}Mn_{1.5}O_4$.

(Negative Electrode Active Material)

The negative electrode active material contained in the negative electrode layer may be at least one material selected from the group consisting of oxides containing at least one element selected from the group consisting of Ti, Si, Sn, Cr, Fe, Nb, and Mo, graphite-lithium compounds, lithium alloys, lithium-containing phosphate compounds having a NASICON structure, lithium-containing phosphate compounds having an olivine structure, lithium-containing oxides having a spinel structure, and the like. Examples of the lithium alloys include Li—Al. Examples of the lithium-containing phosphate compounds having a NASICON structure include $Li_3V_2(PO_4)_3$ and $LiTi_2(PO_4)_3$. Examples of the lithium-containing phosphate compounds having an olivine structure include $LiCuPO_4$. Examples of the lithium-containing oxides having a spinel structure include $Li_4Ti_5O_{12}$.

The positive electrode layer and/or the negative electrode layer may contain a conductive auxiliary agent. The conductive auxiliary agent contained in the positive electrode layer and the negative electrode layer may be at least one agent that contains a metal material such as silver, palladium, gold, platinum, aluminum, copper, or nickel, carbon, and the like.

Further, the positive electrode layer and/or the negative electrode layer may contain a sintering aid. The sintering aid may be at least one compound selected from the group consisting of lithium oxides, sodium oxides, potassium oxides, boron oxides, silicon oxides, bismuth oxides, and phosphorus oxides.

In the solid-state battery of the present invention in one preferred aspect, the positive electrode layer and the negative electrode layer are made of the same material. The solid-state battery of the present invention is "current collector-less" as described later, and the positive electrode layer and the negative electrode layer in such a current collector-less battery may be made of the same material (for example, in such a case, the positive electrode active material and the negative electrode active material may be made of a material of the same type).

(Solid Electrolyte)

The solid electrolyte is a material capable of conducting lithium ions. In particular, the solid electrolyte that makes up the battery building block of the solid-state battery forms a layer capable of conducting lithium ions between the positive electrode layer and the negative electrode layer. It is to be noted that the solid electrolyte is required to be provided at least between the positive electrode layer and the negative electrode layer. In other words, the solid electrolyte may also be present around the positive electrode layer and/or the negative electrode layer so as to protrude from between the positive electrode layer and the negative electrode layer. Specific examples of the solid electrolyte include lithium-containing phosphate compounds having a NASICON structure, oxides having a perovskite structure, and oxides having a garnet structure or a garnet-like structure. Examples of the lithium-containing phosphate compounds having a NASICON structure include $Li_xM_y(PO_4)_3$ (wherein x and y satisfy $1 \le x \le 2$ and $1 \le y \le 2$, and M is at least one element selected from the group consisting of Ti, Ge, Al, Ga, and Zr). Examples of the lithium-containing phosphate compounds having a NASICON structure include $Li_{1.2}Al_{0.2}Ti_{1.8}(PO_4)_3$. Examples of the oxides having a perovskite structure include $La_{0.55}Li_{0.35}TiO_3$. Examples of the oxides having a garnet structure or a garnet-like structure include $Li_7La_3Zr_2O_{12}$.

The solid electrolyte may contain a sintering aid. The sintering aid contained in the solid electrolyte may be selected from, for example, the same materials as the sintering aids that may be contained in the positive electrode layer and/or the negative electrode layer.

(Protective Layer)

The protective layer may generally be formed as an outermost layer of the solid-state battery, and is intended for electrically, physically and/or chemically protecting the solid-state battery. The material that constitutes the protective layer is preferably a material having excellent insulating properties, durability, and/or moisture resistance, and is environmentally safe. For example, it is preferable to use glass, ceramics, a thermosetting resin and/or a photocurable resin or the like.

(Terminals)

Solid-state batteries are generally provided with terminals (for example, external terminals). Terminals are provided, in particular, on the side surfaces of solid-state batteries. More specifically, solid-state batteries are provided with a terminal that is at the positive electrode side and is connected to the positive electrode layer, and a terminal that is at the negative electrode side and is connected to the negative electrode layer. Such terminals preferably contain a material having high electric conductivity. The specific material of the end surface electrode is not particularly limited, but may be at least one material selected from the group consisting of silver, gold, platinum, aluminum, copper, tin, and nickel.

[Features of Solid-State Battery of the Present Invention]

The features of the solid-state battery according to one embodiment of the present invention will be described below in consideration of the basic configuration of the solid-state battery.

The inventors of the present application intensively studied to find, as for the case where a solid electrolyte layer 20 is provided without a gap between a positive electrode layer 10A and a negative electrode layer 10B facing each other, and is provided in contact with an end 30 (at the side of a portion not connected to a terminal) of each of the electrode layers, a solution for properly reducing the occurrence of cracks at the periphery of the solid electrolyte layer during the charging of the solid-state battery. As a result, the inventors of the present application have arrived at the idea of providing a new configuration at an interface region between the end 30 (at the side of a portion not connected to a terminal) of the electrode layer and the solid electrolyte layer 20.

Specifically, the inventors of the present application have arrived at the technical idea of the present invention that in a solid-state battery 500, each of electrode layers 10 is provided with a buffer portion 50 at or adjacent to the end 30 of the electrode layer 10, the buffer portion 50 having a density that is lower than the density of an active material layer 12 in portions other than the end 30 (see FIGS. 1A to 1D). The term "buffer portion" as used herein refers to a portion that relieves the influence of the electrode layers, which expand during the charging, on the solid electrolyte layer or the like that does not expand, and in a narrow sense, refers to a portion that relaxes the stress, which is caused by the electrode layers that expand, applied to the solid electrolyte layer or the like that does not expand. The term "density" as used herein substantially means the cross-sectional density obtained by subjecting a cross-sectional photograph of the buffer portion to image processing (that is, the density is the occupancy of the active material substance that constitutes the buffer portion).

Figure 1B:
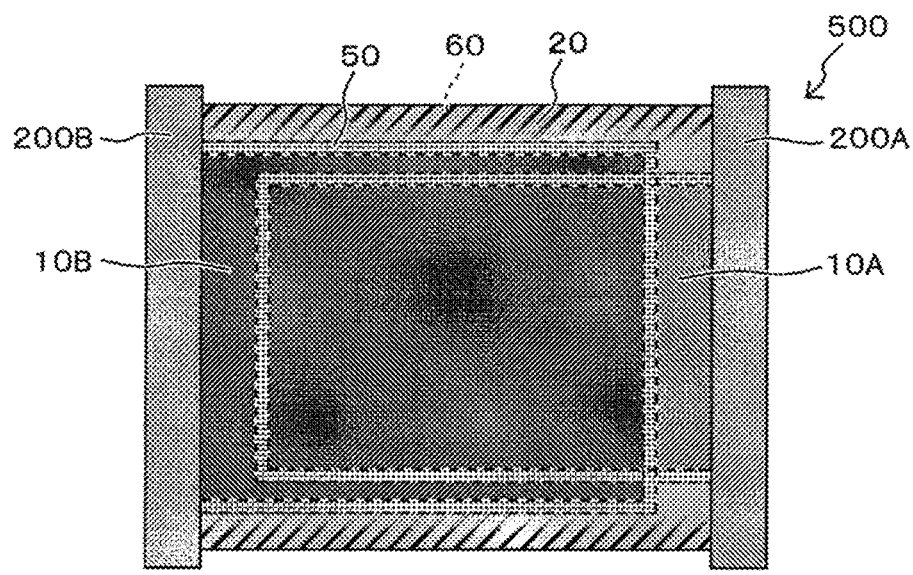
FIG. 1B is a plan view schematically illustrating the solid-state battery according to one embodiment of the present invention.
Figure 1C:
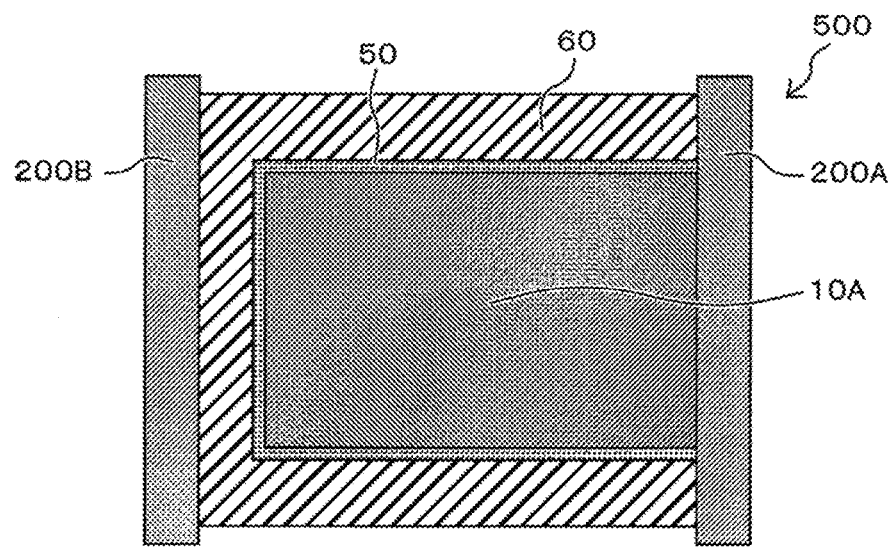
FIG. 1C is a schematic plan view of a section along a portion (layer) in which a positive electrode layer is disposed in FIG. 1B.
Figure 1D:
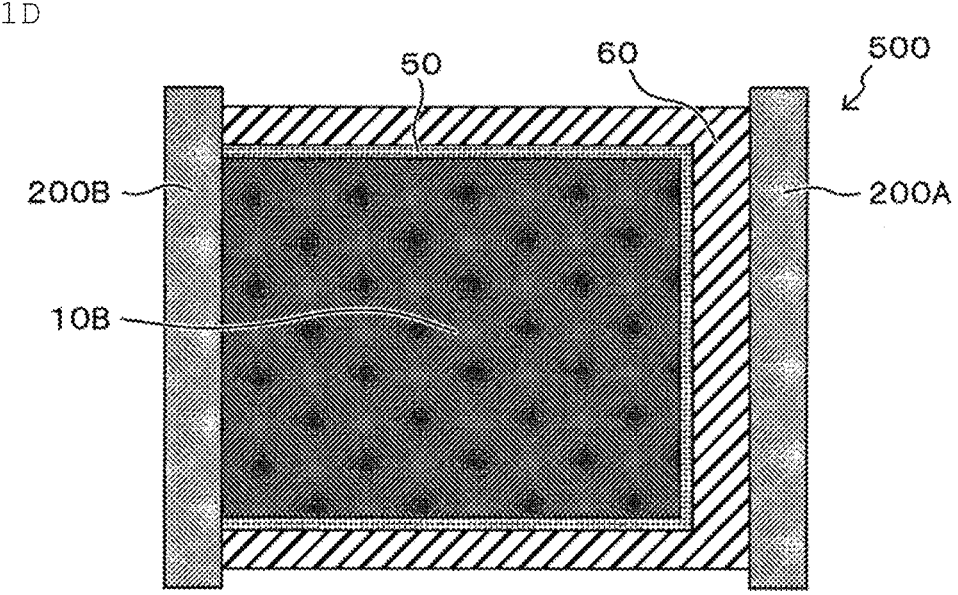
FIG. 1D is a schematic plan view of a section along a portion (layer) in which a negative electrode layer is disposed in FIG. 1B.

According to such a technical idea, each of the electrode layers 10 is provided with the buffer portion 50 at or adjacent to the end 30 of the electrode layer 10, the buffer portion 50 having a density that is lower than the density of the active material layer 12 (positive electrode active material layer 12A/negative electrode active material layer 12B) in portions other than the end of the electrode layer 10. Specifically, as shown in FIG. 1A, in a cross-sectional view, the positive electrode layer 10A and the negative electrode layer 10B are formed to face each other with the solid electrolyte layer 20 interposed therebetween. Further, as shown in FIGS. 1B to 1D, in a plan view, the electrode layer 10 (positive electrode layer 10A/negative electrode layer 10B) is formed to be surrounded by the buffer portion 50 provided at or adjacent to the end of the electrode layer 10 (positive electrode layer 10A/negative electrode layer 10B) and a terminal (positive electrode terminal 200A/negative electrode terminal 200B). As will be described in detail below, during the charging of the solid-state battery 500, the presence of the buffer portion 50 makes it possible to relax the stress that is caused by the expansion of the active material layers 12 and may be generated at the solid electrolyte layer 20 that does not expand.

One embodiment of the present invention is characterized in that a buffer portion is provided, and as described above, as for the place where the buffer portion is provided, the cases can be divided into (1) a case where the buffer portion is provided at an end of the electrode layer, and (2) a case where the buffer portion is provided adjacent to an end of the electrode layer.

Figure 2A:
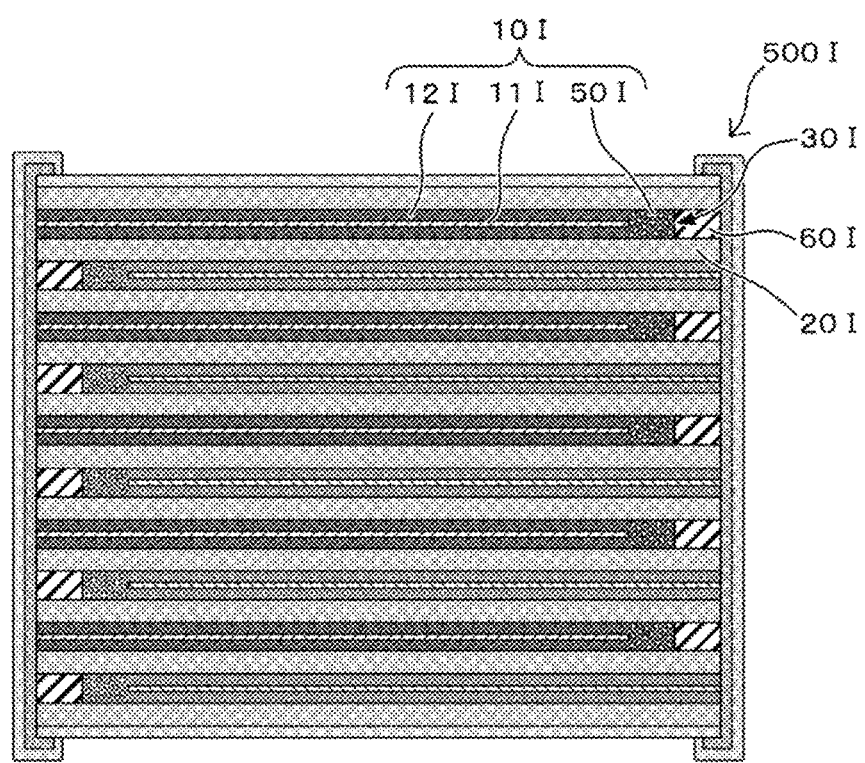
FIG. 2A is a cross-sectional view schematically illustrating a solid-state battery in which each electrode is provided with, at an end thereof, a buffer portion including an active material member in a porous form.
Figure 2B:
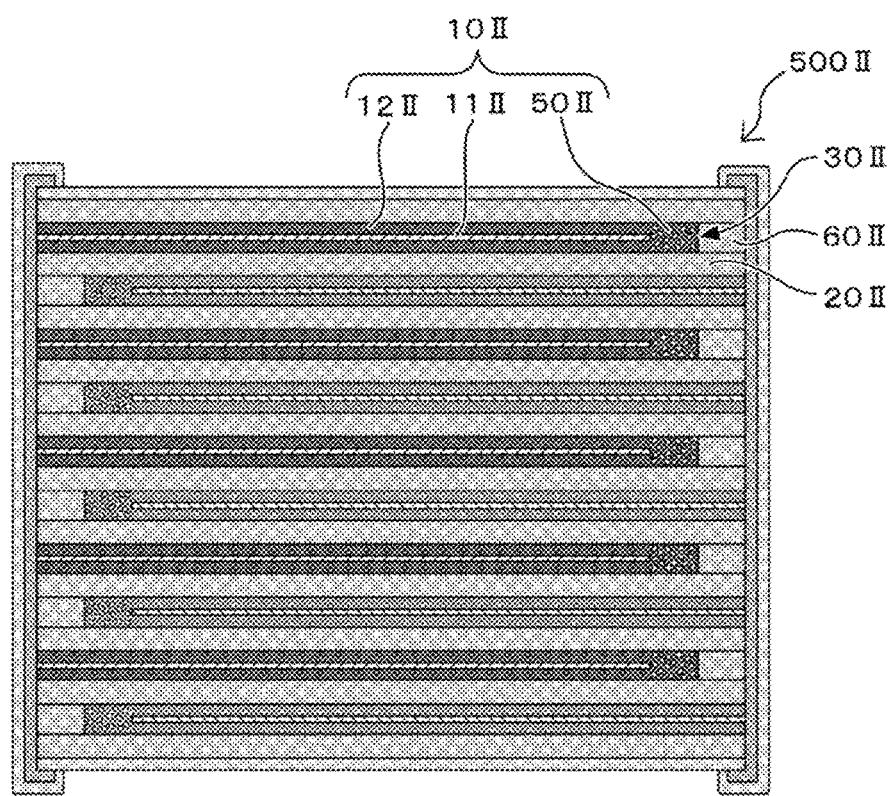
FIG. 2B is a cross-sectional view schematically illustrating a solid-state battery in which each electrode is provided with, at an end thereof, a buffer portion including an active material member in a porous form.

(1) The Case where the Buffer Portion is Provided at an End of the Electrode Layer First, the case where buffer portions 50I and 50II are provided at ends 30I and 30II of electrode layers 10I and 10II, respectively, will be described (see FIGS. 2A and 2B).

When the buffer portions 50I and 50II are provided at the ends 30I and 30II of the electrode layers 10I and 10II, respectively, it means that each of the electrode layers has the buffer portion as a component thereof. In this case, the buffer portions 50I and 50II may have a porous form from the viewpoint that the buffer portions 50I and 50II that are part of the electrode layers may also serve as "electrodes". In particular, when the buffer portions 50I and 50II are provided at the ends 30I and 30II, that is, part of the electrode layers, respectively, it is preferable that each of the buffer portions 50I and 50II include an active material member in a porous form. The aspect shown in FIG. 2A and the aspect shown in FIG. 2B are common in that the buffer portion includes an active material member in a porous form. Meanwhile, the two aspects are different from each other in that in the aspect shown in FIG. 2A, the portion in contact with the end 30I (at the side of a portion not connected to a terminal) of the electrode layer is an insulating portion 60I, while in the aspect shown in FIG. 2B, the portion in contact with the end 30II (at the side of a portion not connected to a terminal) of the electrode layer is a solid electrolyte portion 60II.

The term "insulating portion" as used herein refers to a portion that is disposed adjacent to the end of the buffer portion and includes an insulating member. The term "solid electrolyte portion" as used herein refers to a portion that is disposed adjacent to the end of the buffer portion, and the constituent material (solid electrolyte member) of the solid electrolyte portion is the same as the constituent material (solid electrolyte member) of the solid electrolyte layer interposed between the positive electrode layer and the negative electrode layer.

When the buffer portions 50I and 50II have a porous form, a large number of micro-sized pores are formed, and active material grains are connected to each other in a portion where the pores are not formed (the portion is referred to as a pore-free portion). As a result, even when the buffer portions 50I and 50II have a porous form, the buffer portions 50I and 50II may properly serve as, for example, a portion capable of storing and releasing lithium ions.

As described above, when the buffer portions 50I and 50II have a porous form, a large number of micro-sized pores are formed. Since each of the large number of pores has a micro-sized void (space), the active material member is absent in the pore portion. Therefore, due to the absence of the active material in the pore portion, the buffer portions 50I and 50II may have a relatively lower density of the active material member than the density of the active material layer in portions of the electrode layers 10I and 10II other than the buffer portions 50I and 50II. Although the active material member may as a whole serve as a factor acting on the expansion of the active material layers 12I and 12II included in the electrode layers 10I and 10II during the charging of the solid-state batteries 500I and 500II, as described above, the buffer portions 50I and 50II provided at the ends 30I and 30II of the electrodes may have a relatively lower density of the active material member. Therefore, due to the low density, it is possible to set the degree of expansion of the buffer portions 50I and 50II provided at the ends 30I and 30II, that is, part of the electrode layers 10I and 10II, respectively, smaller than the degree of expansion of the active material layers 12I and 12II in portions of the electrode layers 10I and 10II other than the buffer portions 50I and 50II.

Further, in this aspect, the Young's modulus of the buffer portions 50I and 50II provided at the ends 30I and 30II of the electrode layers 10I and 10II, respectively, that is, $E=E_0(1-P)$ (wherein E is the Young's modulus, and P is the porosity) is preferably 50% or less of the Young's modulus of the active material layers 12I and 12II in portions of the electrode layers 10I and 10II other than the buffer portions 50I and 50II. When the Young's modulus of the buffer portions 50I and 50II is relatively low (50% or less) due to the presence of the large number of pores, the following technical effects may be exerted when the active material layers 12I and 12VI may expand during the charging even if the pressing force caused by the expansion of the active material layers 12V and 12VI is applied to the insulating portion 60I or the solid electrolyte portion 60II.

Specifically, when the Young's modulus of the buffer portions 50I and 50II is relatively low, the buffer portions 50I and 50II are more easily deformed than the active material layers 12I and 12II in portions of the electrode layers 10I and 10II other than the buffer portions 50I and 50II due to the low Young's modulus. Therefore, due to the deformation, the buffer portions 50I and 50II can absorb the pressing force caused by the expansion of the active material layers 12I and 12II in portions of the electrode layers 10I and 10II other than the buffer portions 50I and 50II. As a result, it is possible to inhibit, as a whole, the predetermined pressing force caused by the expansion of the active material layers 12I and 12II from being directly transmitted to the insulating portion 60I or the solid electrolyte portion 60II.

Therefore, since the buffer portions 50I and 50II having a relatively small degree of expansion are provided at the ends 30I and 30II of the electrode layers 10I and 10II, respectively, when the insulating portion 60I or the solid electrolyte portion 60II is in contact with the end 30I or 30II of the electrode layer 10I or 10II, respectively, relatively small stress is generated at the insulating portion 60I or the solid electrolyte portion 60II in contact with the end 30I or 30II. Accordingly, due to the generation of relatively small stress, it is possible to properly reduce the occurrence of cracks at the periphery of the insulating portion 60I or at the periphery of the solid electrolyte portion 60II. Therefore, since the occurrence of cracks is properly reduced, it becomes possible to properly charge and discharge the solid-state batteries 500I and 500II.

In the aspect of the above-mentioned case (1), it is preferable that the buffer portion be formed, in a plan view, on the entire contour of the portion of the electrode layer not connected to a terminal excluding a portion of the electrode layer connected to a terminal. As a result, stress is more properly relaxed by the buffer portion as compared with the case where the buffer portion is formed only partially on the contour of the portion of the electrode layer not connected to a terminal.

(2) The Case where the Buffer Portion is Provided Adjacent to an End of the Electrode Layer Next, the case where the buffer portion is provided adjacent to an end of the electrode layer will be described. This case can be divided into (2-1) a case where the buffer portion is hollow, (2-2) a case where the buffer portion has a porous form, and (2-3) a case where the buffer portion is an active material-free portion. The buffer portion may have any combination of these patterns.

(2-1) The Case where Buffer Portions 50III and 50IV are Hollow

In the following, (2-1) the case where the buffer portions 50III and 50IV provided adjacent to the ends of the electrode layers are hollow will be described (see FIGS. 3A and 3B). The aspect shown in FIG. 3A and the aspect shown in FIG. 3B are common in that the buffer portion is hollow. Meanwhile, the two aspects are different from each other in that in the aspect shown in FIG. 3A, an insulating portion 60III is provided leaving a space from an end 30III (at the side of a portion not connected to a terminal) of each electrode layer, while in the aspect shown in FIG. 3B, a solid electrolyte portion 60IV is provided leaving a space from an end 30III (at the side of a portion not connected to a terminal) of each electrode layer.

When the buffer portions 50I and 50II provided adjacent to the ends 30III and 30IV of electrode layers 10III and 10IV, respectively, are hollow, components of solid-state batteries 500III and 500V are absent in the hollow portion. Therefore, the ends 30III and 30IV of the electrode layers 10III and 10IV do not come into direct contact with the insulating portion 60III and the solid electrolyte portion 60IV, respectively, and each of the ends 30III and 30IV and the portion may be arranged so as to leave a space between them.

When such a spaced arrangement is employed, even if active material layers 12III and 12IV, which are the components of the electrode layers 10III and 10IV, expand during the charging of the solid-state batteries 500III and 500IV, it is possible to inhibit the ends 30III and 30IV of the expanded active material layers 12III and 12IV from coming into direct contact with the insulating portion 60III and the solid electrolyte portion 60IV, respectively. Therefore, it is possible to prevent the ends 30III and 30IV of the expanded active material layers 12III and 12IV from directly pressing the insulating portion 60III and the solid electrolyte portion 60IV, respectively, and therefore, it is also possible to inhibit the generation of stress itself at the insulating portion 60III or the solid electrolyte portion 60IV. As a result, due to inhibition of the generation of stress, it is possible to more properly reduce the occurrence of cracks at the periphery of the insulating portion 60III or at the periphery of the solid electrolyte portion 60IV. Therefore, since the occurrence of cracks is more properly reduced, it becomes possible to more properly charge and discharge the solid-state batteries 500III and 500IV.

(2-2) The Case where Buffer Portions 50V and 50VI have a Porous Form

Next, (2-2) the case where the buffer portions 50V and 50VI provided adjacent to the ends of the electrode layers have a porous form will be described (see FIGS. 4A and 4B). In this case, the aspect shown in FIG. 4A and the aspect shown in FIG. 4B are common in that the buffer portions 50V and 50VI having a porous form are each provided at a portion adjacent to an end of each electrode layer. However, the two aspects are different from each other in that in the aspect shown in FIG. 4A, a buffer portion including an insulating member in a porous form is provided adjacent to an end 30V (at the side of a portion not connected to a terminal) of each electrode layer, while in the aspect shown in FIG. 4B, a buffer portion including a solid electrolyte material in a porous form is provided adjacent to an end 30VI (at the side of a portion not connected to a terminal) of each electrode layer.

When the buffer portions 50V and 50VI in a porous form are provided at portions adjacent to the ends 30V and 30VI of electrode layers 10V and 10VI, respectively, a large number of micro-sized pores are formed in the portions. Each of the large number of pores will have a micro-sized void (space). Therefore, due to the formation of the voids in the pore portion, the buffer portions 50V and 50VI may have a relatively lower density than the densities of active material layers 12V and 12VI (active material substances) in the electrode layers 10V and 10VI.

As described above, the active material layers 12V and 12VI may expand during the charging of solid-state batteries 500V and 500VI, and the pressing force caused by the expansion of the active material layers 12V and 12VI may be applied to an insulating portion 60V or a solid electrolyte portion 60VI. In this aspect, the insulating portion 60V or the solid electrolyte portion 60VI having a large number of pores is provided at the portion to which the pressing force is applied. Therefore, the grains that constitute the insulating portion 60V or the solid electrolyte portion 60VI are connected to each other in the "pore-free" portion of the insulating portion 60V or the solid electrolyte portion 60VI, and the pressing force caused by the expansion of the active material layers 12V and 12VI may be transmitted to the insulating portion 60V or the solid electrolyte portion 60VI. Meanwhile, since the grains that constitute the insulating portion 60V or the solid electrolyte portion 60VI are absent in the "pore" portion of the insulating portion 60V or the solid electrolyte portion 60VI, it is possible to make the pressing force caused by the expansion of the active material layers 12V and 12VI less easily transmitted to the insulating portion 60V or the solid electrolyte portion 60VI.

Further, in this aspect, the Young's modulus of the buffer portions 50V and 50VI, that is, $E=E_0(1-P)$ (wherein E is the Young's modulus, and P is the porosity) is preferably 50% or less of the Young's modulus of the electrode layers 10V and 10VI (specifically, the active material layers 12V and 12VI). When the Young's modulus of the buffer portions 50V and 50VI is relatively low (50% or less) due to the presence of the large number of pores, the following technical effects may be exerted when the active material layers 12V and 12VI may expand during the charging even if the pressing force caused by the expansion of the active material layers 12V and 12VI is applied to the buffer portions 50V and 50VI. Specifically, when the Young's modulus of the buffer portion is relatively low, the buffer portion may be easily deformed in response to the pressing force due to the low Young's modulus. Therefore, due to the deformation, the buffer portion can absorb the pressing force. As a result, it is possible to inhibit the predetermined pressing force caused by the expansion of the active material layers 12V and 12VI from being directly transmitted to the insulating portion 60V or the solid electrolyte portion 60VI.

As a result, relatively small stress is generated at the insulating portion 60V or the solid electrolyte portion 60VI in contact with the buffer portion. Accordingly, due to the generation of relatively small stress, it is possible to properly reduce the occurrence of cracks at the periphery of the insulating portion 60V or at the periphery of the solid electrolyte portion 60VI. Therefore, since the occurrence of cracks is properly reduced, it becomes possible to properly charge and discharge the solid-state batteries 500V and 500VI.

Figure 4A:
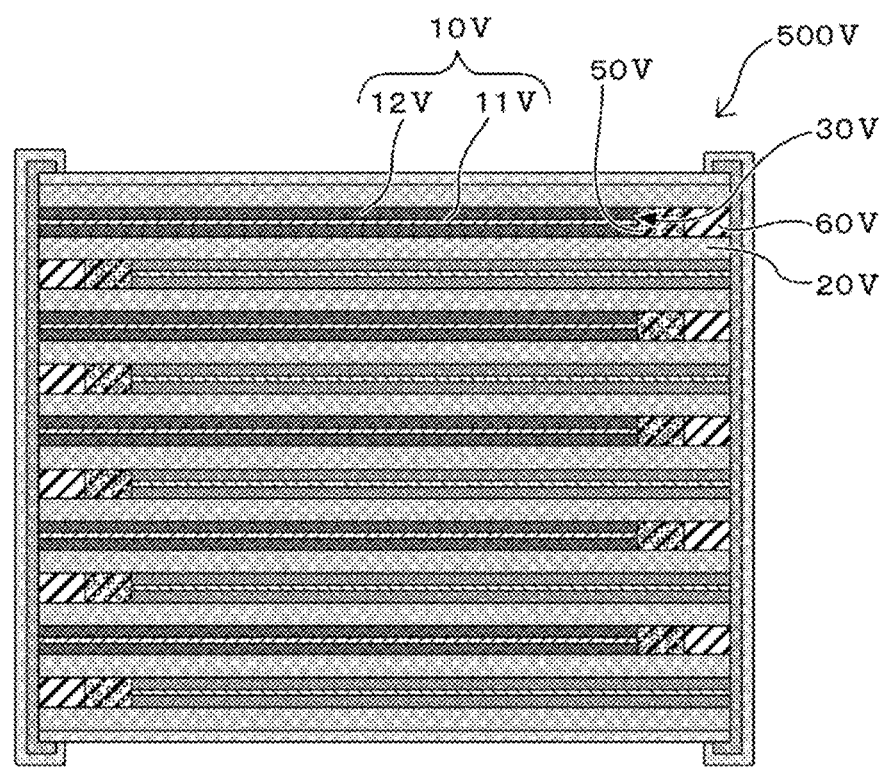
FIG. 4A is a cross-sectional view schematically illustrating a solid-state battery in which each electrode is provided with, adjacent to an end thereof, a buffer portion including a solid electrolyte member in a porous form.
Figure 4B:
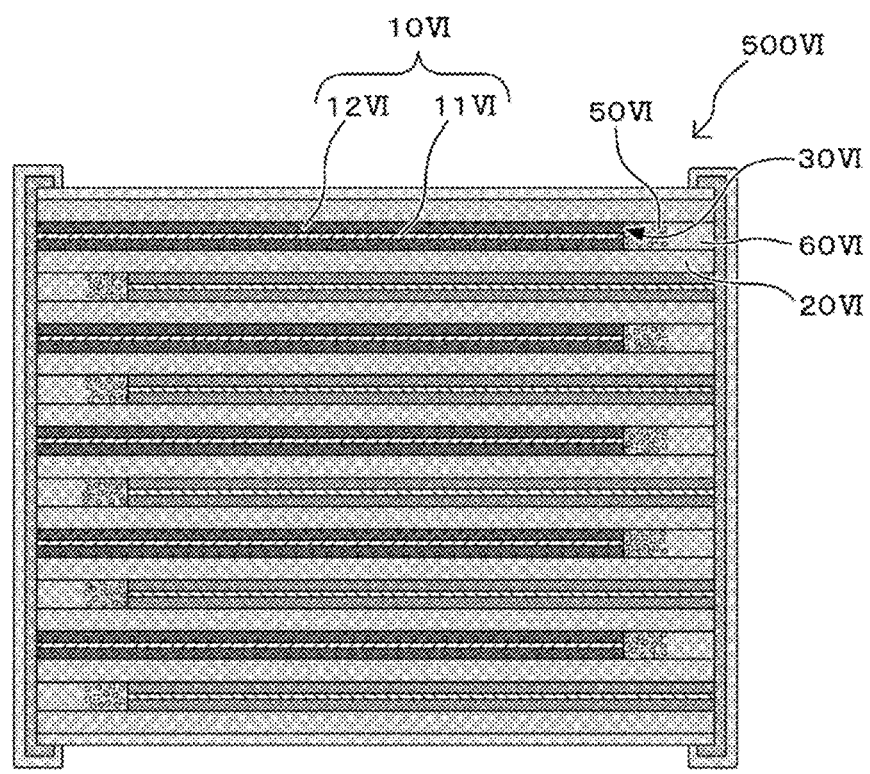
FIG. 4B is a cross-sectional view schematically illustrating a solid-state battery in which each electrode is provided with, adjacent to an end thereof, a buffer portion including an insulating member in a porous form.

In the aspect shown in FIG. 4A described above, the buffer portion including the insulating member in a porous form and the insulating portion are disposed adjacent to each other. That is, in a plan view, the insulating portion is disposed adjacent to an end of the buffer portion. The buffer portion including the insulating member in a porous form has a function of inhibiting the predetermined pressing force caused by the expansion of the active material layer from being directly transmitted to the insulating portion. In contrast, the insulating portion does not have the function since it does not have a porous form. Due to the difference in configuration and the difference in function, the "buffer portion including the insulating member in a porous form" and the "insulating portion" are mutually different constituent members in the solid-state battery according to one embodiment of the present invention.

Similarly, in the aspect shown in FIG. 4B described above, the buffer portion including the solid electrolyte material in a porous form and the solid electrolyte portion are disposed adjacent to each other. That is, the solid electrolyte portion is disposed adjacent to an end of the buffer portion. The buffer portion including the solid electrolyte member in a porous form has a function of inhibiting the predetermined pressing force caused by the expansion of the active material layer from being directly transmitted to the solid electrolyte portion. In contrast, the solid electrolyte portion does not have the function since it does not have a porous form. Due to the difference in configuration and the difference in function, the "buffer portion including the solid electrolyte member in a porous form" and the "solid electrolyte portion" are mutually different constituent members in the solid-state battery according to one embodiment of the present invention.

Figure 5:
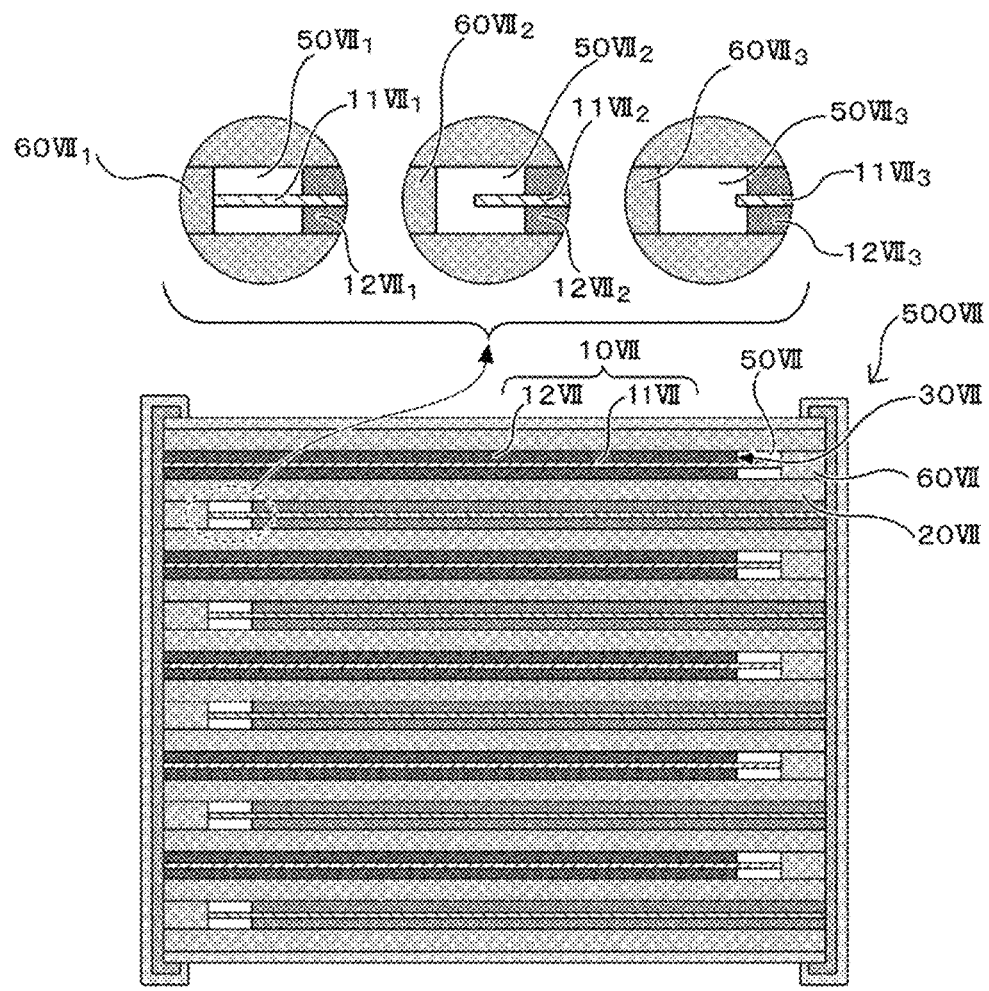
FIG. 5 is a cross-sectional view schematically illustrating a solid-state battery in which the buffer portion is an active material-free portion.

(2-3) The Case where a Buffer Portion 50VII is an Active Material-Free Portion In the following, (2-3) the case where the buffer portion 50VII provided adjacent to the end of the electrode layer is an active material-free portion will be described (see FIG. 5). The aspect shown in FIG. 5 is common to the aspects shown in FIGS. 3A and 3B in that no active material is present. Meanwhile, the aspect shown in FIG. 5 is different from the aspects shown in FIGS. 3A and 3B in that a current collector layer 11VII is present.

Figure 3A:
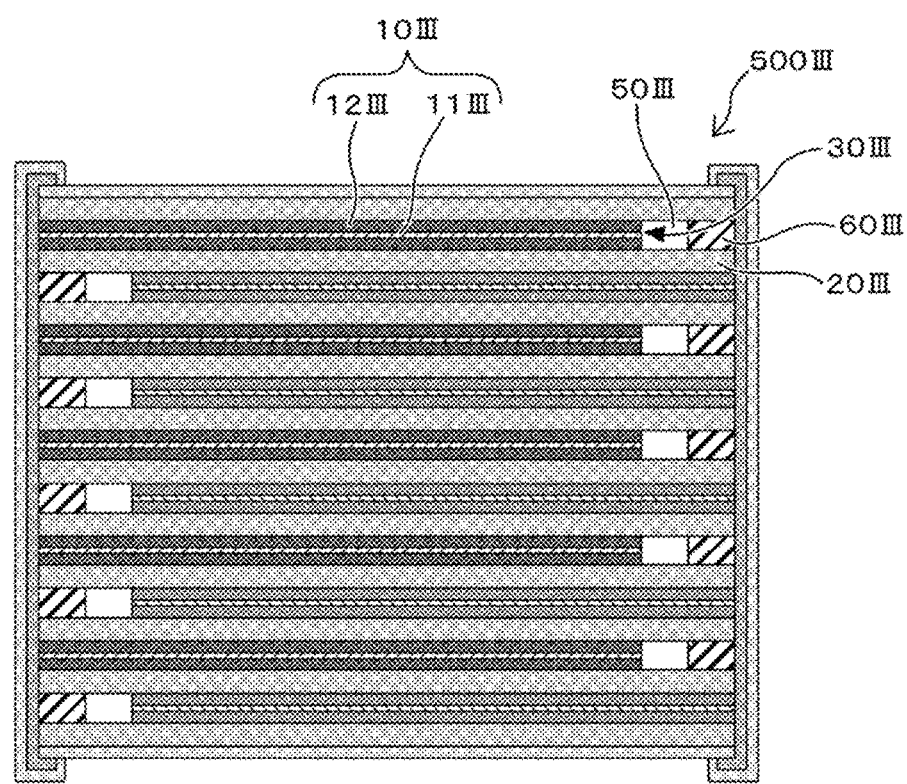
FIG. 3A is a cross-sectional view schematically illustrating a solid-state battery in which each electrode is provided with, adjacent to an end thereof, a hollow buffer portion.
Figure 3B:
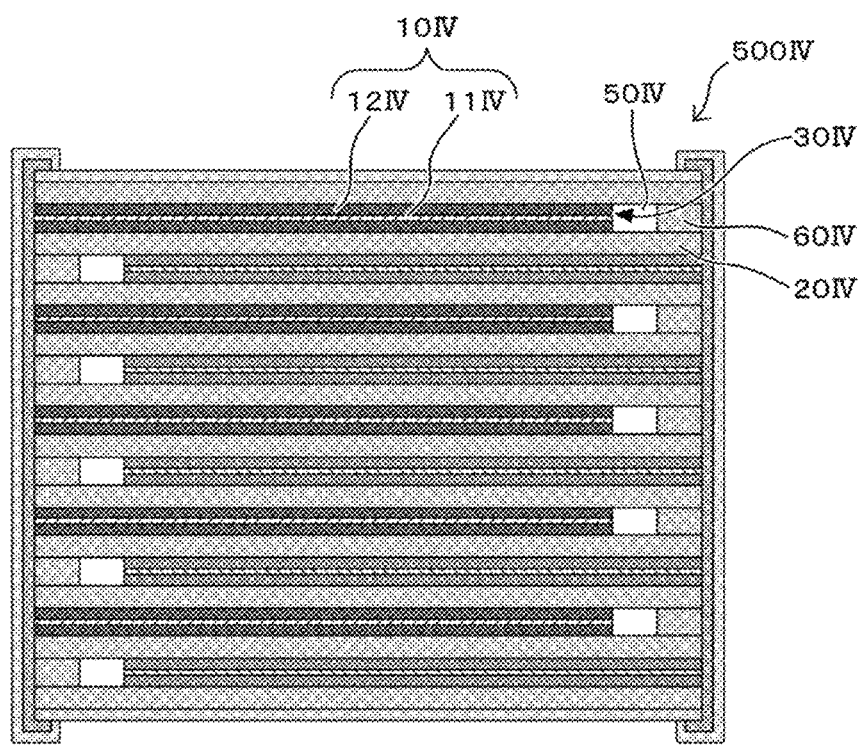
FIG. 3B is a cross-sectional view schematically illustrating a solid-state battery in which each electrode is provided with, adjacent to an end thereof, a hollow buffer portion.

When the electrode layer includes the current collector layer in addition to the active material layer, in the aspects shown in FIGS. 3A and 3B, the hollow buffer portions 50III and 50IV may be provided to solve the problem caused by the expansion of the active material layer during the charging of the solid-state battery. Although it is essential that there is no expandable active material substance in the hollow buffer portion, it is not essential that there is no current collector layer that is not expandable in the hollow buffer portion. Specifically, as shown in FIG. 5, if the buffer portion 50VII is an active material-free portion that is at least free of an active material, a current collector layer 11VII$_1$ may be in direct contact with a solid electrolyte portion 60VII$_1$ or an insulating portion (not shown). Further, one end of a current collector layer 11VII$_2$ or 11VII$_3$ may partially extend in a buffer portion 50VII$_2$ or 50VII$_3$, respectively.

As described above, in the aspect shown in FIG. 5, each of the buffer portions 50VII is an active material-free portion that is at least free of an active material. Therefore, an active material layer 12VII (12VII$_1$ to 12VII$_3$) at an end 30VII of an electrode layer 10VII does not come into direct contact with a solid electrolyte portion 60VII (60VII$_1$ to 60VII$_3$) or an insulating portion (not shown), and the active material layer 12VII and the portion may be arranged so as to leave a space between them.

When such a spaced arrangement is employed, even if the active material layer 12VII, which is the component of the electrode layer 10VII, expands during the charging of a solid-state battery 500VII, it is possible to inhibit the end 30VII of the expanded active material layer 12VII from coming into direct contact with the solid electrolyte portion 60VII or an insulating portion. Therefore, it is possible to prevent the end 30VII of the expanded active material layer 12VII from directly pressing the solid electrolyte portion 60VII or an insulating portion. Thus, it is also possible to inhibit the generation of stress itself at the solid electrolyte portion 60VII or an insulating portion. As a result, due to inhibition of the generation of stress, it is possible to properly reduce the occurrence of cracks at the periphery of the solid electrolyte portion 60VII or at the periphery of an insulating portion. Therefore, since the occurrence of cracks is properly reduced, it becomes possible to properly charge and discharge the solid-state battery 500VII.

In the aspect of the above-mentioned case (2), it is preferable that the buffer portion be formed, in a plan view, to surround the entire contour of the portion of the electrode layer not connected to a terminal. As a result, stress is more properly relaxed by the buffer portion as compared with the case where the buffer portion is formed to only partially surround the contour of the portion of the electrode layer not connected to a terminal.

[Method for Manufacturing Solid-State Battery of the Present Invention]

In the following, a method for manufacturing a solid-state battery according to one embodiment of the present invention will be described. The manufacturing method corresponds to a method for manufacturing the solid-state battery 500 according to the above-mentioned embodiment of the present invention. In the following steps, an aspect in which a printing method such as a screen printing method is mainly employed will be mainly described, but the method is not limited thereto, and the solid-state battery can be manufactured by a green sheet method using a green sheet or a composite method of the above-mentioned methods.

(First Step) Production of Solid Electrolyte Paste 20α

First, the solid electrolyte paste 20α is screen-printed on a support portion 80α. The step is not limited to screen printing, and it is also possible to form a solid electrolyte sheet 20α by sheet molding.

(Second Step) Production of Electrode Layer Paste/Buffer Portion Paste/Solid Electrolyte Paste or Insulating Member Paste After the production of the solid electrolyte paste 20α, an electrode layer paste 10α/a buffer portion paste 50α/a solid electrolyte paste or insulating member paste 60α is screen-printed on the solid electrolyte paste 20α using a screen printing machine. After the printing, the pastes are dried.

Figure 6A:
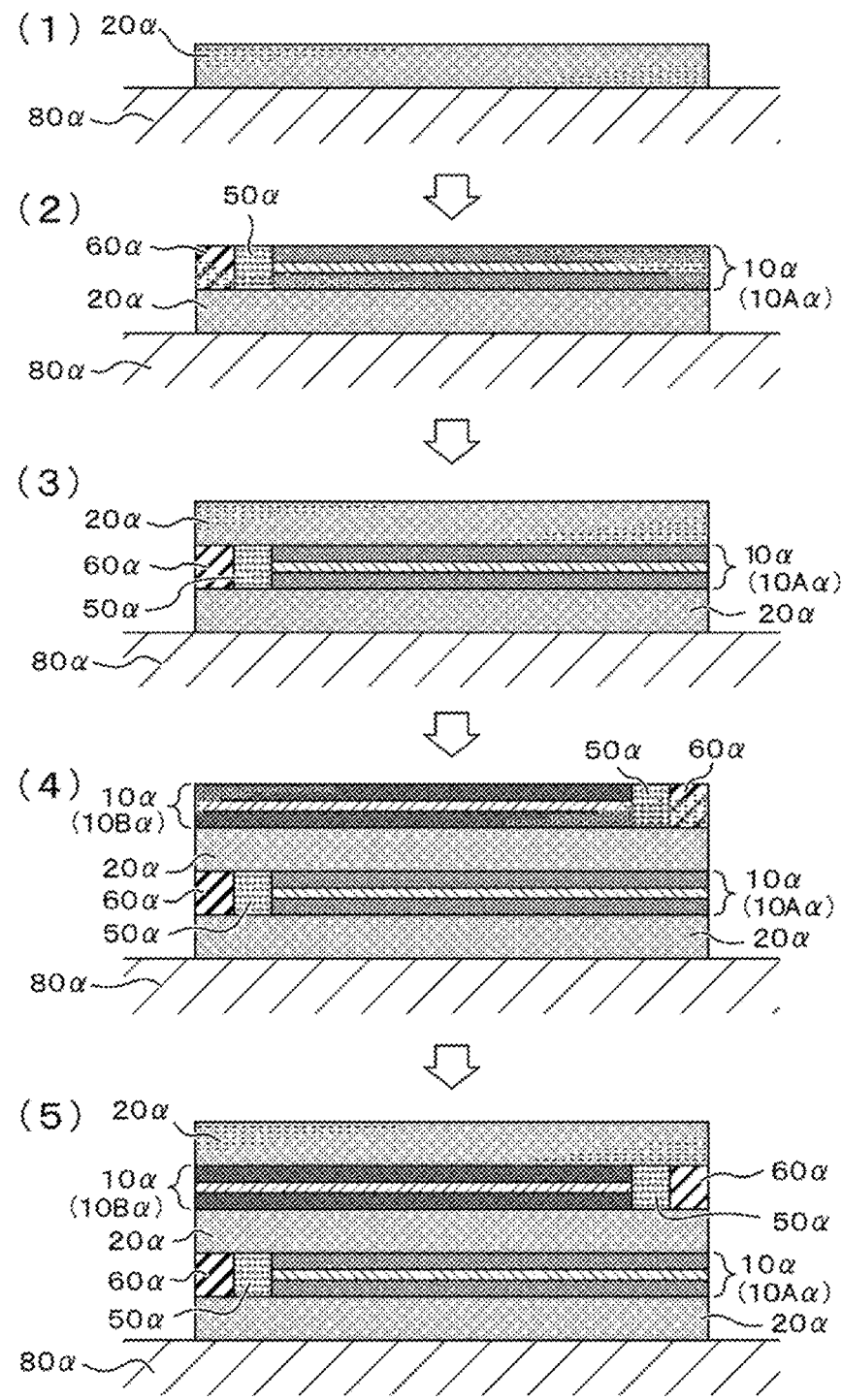
FIG. 6A is a schematic view illustrating a method for manufacturing a solid-state battery according to one embodiment of the present invention.
Figure 6B:
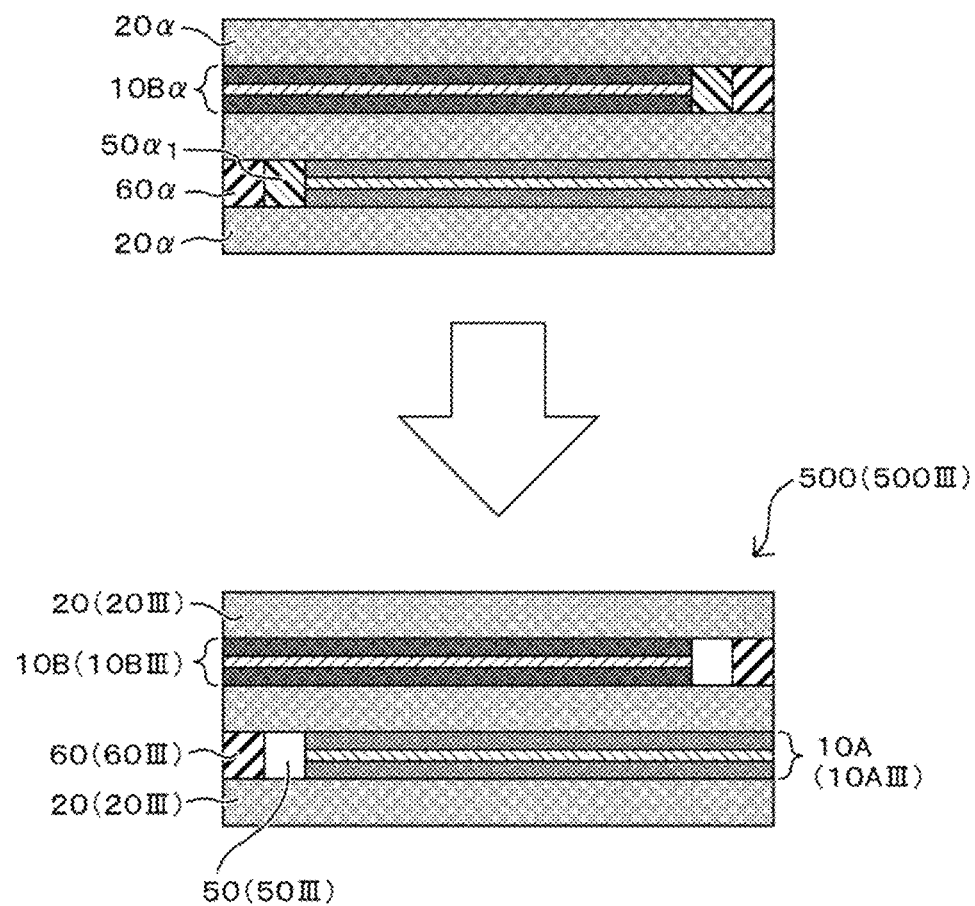
FIG. 6B is a schematic view illustrating a method for manufacturing a solid-state battery, the method being intended for forming a hollow buffer portion.

Various aspects can be employed as for the buffer portion paste 50α. In one aspect, at the time of printing, as shown in FIG. 6B, a mixture 50α₁ of a resin material, an organic material, and a solvent can be selected as the buffer portion paste 50α. The selection of the resin material enables to eliminate the buffer portion paste 50α during the firing performed later. The resin material is not particularly limited as long as it is dissipated during the firing performed later, and may be at least one resin material selected from the group consisting of a styrene-butadiene rubber, polyacrylic acid, polyvinylidene fluoride, a polyimide resin, and a polyamideimide resin.

Figure 6C:
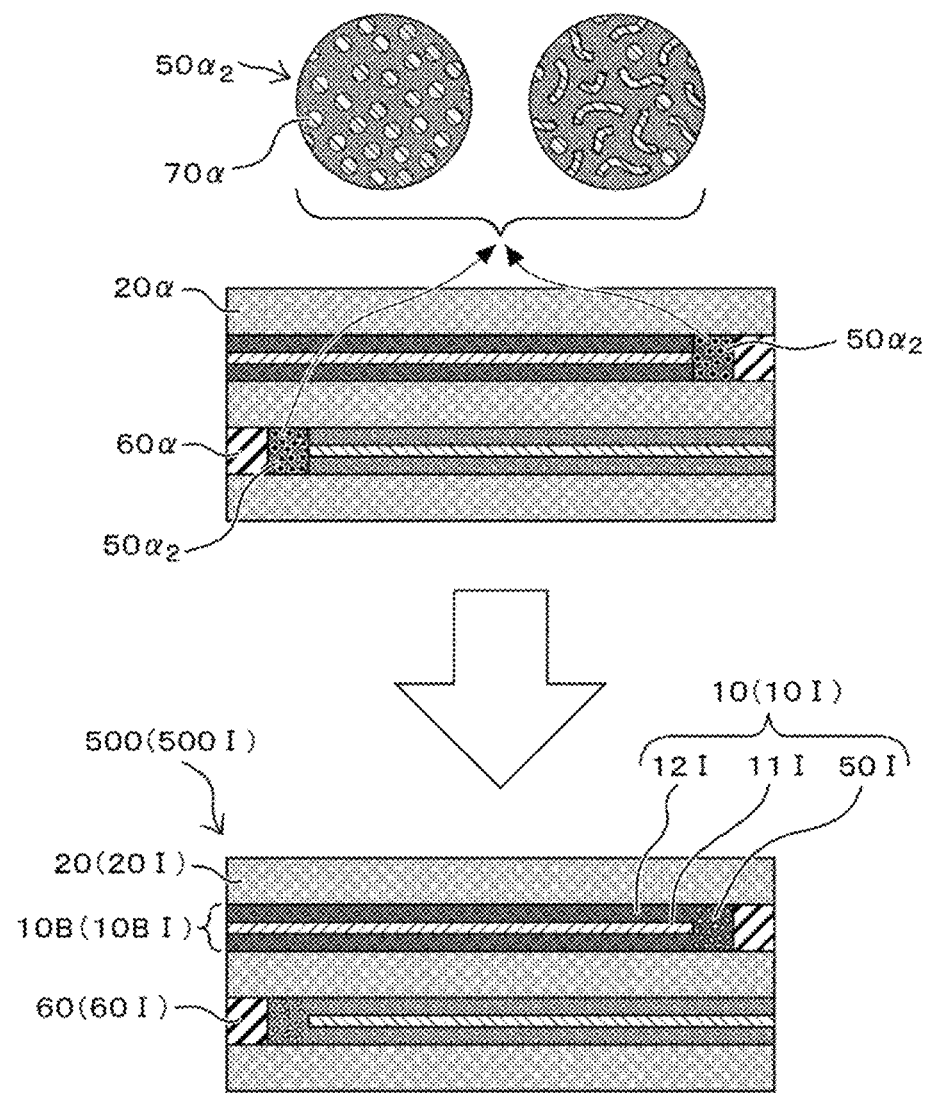
FIG. 6C is a schematic view illustrating a method for manufacturing a solid-state battery, the method being intended for forming a buffer portion having a porous form.

In another aspect, as shown in FIG. 6C, a mixture 50α₂ of an active material substance, a resin filler, an organic material, and a solvent can be selected as the buffer portion paste 50α. The buffer portion paste 50α is not limited to the mixture 50α₂, and a mixture of an insulating material or a solid electrolyte material, a resin filler, an organic material, and a solvent can be selected as the buffer portion paste 50α (the mixture is not shown). The selection of the resin filler 70α enables to eliminate the buffer portion paste 50α during the firing performed later.

(Third Step) Production of Solid Electrolyte Paste 20α

Next, the solid electrolyte paste 20α is screen-printed. Then, the solid electrolyte paste 20α is dried. The step is not limited to screen printing and drying, and it is also possible to form a solid electrolyte sheet 20α by sheet molding.

(Fourth Step) Production of Electrode Layer Paste/Buffer Portion Paste/Solid Electrolyte Paste or Insulating Member Paste After the production of the solid electrolyte paste 20α, the electrode layer paste 10α is screen-printed on the solid electrolyte paste 20α. Then, the buffer portion paste 50α is screen-printed so as to surround the electrode layer paste 10α, and the solid electrolyte paste or insulating member paste 60α is screen-printed so as to surround the buffer portion paste 50α. After the printing, the electrode layer paste 10α and the above-mentioned pastes are dried.

Various aspects can be employed as for the buffer portion paste 50α. In one aspect, as shown in FIG. 6B, the mixture 50α₁ of a resin material, an organic material, and a solvent can be selected as the buffer portion paste 50α. The selection of the resin material enables to eliminate the buffer portion paste 50α during the firing performed later. The resin material is not particularly limited as long as it is dissipated during the firing performed later, and for example, a polyvinyl acetal resin can be selected.

In another aspect, as shown in FIG. 6C, the mixture 50α₂ of an active material substance, the resin filler 70α, an organic material, and a solvent can be selected as the buffer portion paste 50α. The buffer portion paste 50α is not limited to the mixture 50α₂, and a mixture of an insulating material or a solid electrolyte material, the resin filler 70α, an organic material, and a solvent can be selected as the buffer portion paste 50α (the mixture is not shown). The selection of the resin filler 70α enables to eliminate the buffer portion paste 50α during the firing performed later. The material of the resin filler 70α is not particularly limited, and for example, a polyvinyl acetal resin can be selected.

(Fifth Step) Production of Solid Electrolyte Paste 20α

Next, the solid electrolyte paste 20α is screen-printed. The step is not limited to screen printing, and it is also possible to form a solid electrolyte sheet 20α by sheet molding.

(Sixth Step) Production of Protective Layer Paste

Next, the protective layer paste is screen-printed using a screen printing machine. After the printing, the protective layer paste is dried.

The above-mentioned steps provide a predetermined laminate.

In the above-mentioned steps, the positive electrode layer paste at the time of printing may contain, for example, a positive electrode active material, a conductive material, a solid electrolyte material, an organic material, and a solvent. The negative electrode layer paste at the time of printing may contain, for example, a negative electrode active material, a conductive material, a solid electrolyte material, an organic material, and a solvent. The solid electrolyte paste at the time of printing may contain, for example, a solid electrolyte material, a sintering aid, an organic material, and a solvent. The insulating member paste at the time of printing may contain, for example, an insulating substance material, an organic material, and a solvent. The protective layer paste at the time of printing may contain, for example, an insulating substance material, an organic material, and a solvent.

For the solid electrolyte material, as described above, a powder containing a lithium-containing phosphate compound having a NASICON structure, an oxide having a perovskite structure, and/or an oxide having a garnet structure or a garnet-like structure may be selected.

For the positive electrode active material substance, for example, at least one material selected from the group consisting of lithium-containing phosphate compounds having a NASICON structure, lithium-containing phosphate compounds having an olivine structure, lithium-containing layered oxides, lithium-containing oxides having a spinel structure, and the like may be selected.

For the negative electrode active material substance, for example, at least one material selected from the group consisting of oxides containing at least one element selected from the group consisting of Ti, Si, Sn, Cr, Fe, Nb, and Mo, graphite-lithium compounds, lithium alloys, lithium-containing phosphate compounds having a NASICON structure, lithium-containing phosphate compounds having an olivine structure, lithium-containing oxides having a spinel structure, and the like may be selected.

The insulating substance material contained in the insulating member paste may be formed of, for example, a glass material, a ceramic material, and the like. For the insulating substance material contained in the protective layer paste, for example, it is preferable to use at least one material selected from the group consisting of glass materials, ceramic materials, thermosetting resin materials, photocurable resin materials, and the like.

The organic material is not particularly limited, and at least one polymer material selected from the group consisting of a polyvinyl acetal resin, a cellulose resin, a polyacrylic resin, a polyurethane resin, a polyvinyl acetate resin, a polyvinyl alcohol resin, and the like can be used.

The solvent is not particularly limited as long as it can dissolve the organic material, and for example, toluene and/or ethanol can be used.

The sintering aid may be at least one compound selected from the group consisting of lithium oxides, sodium oxides, potassium oxides, boron oxides, silicon oxides, bismuth oxides, and phosphorus oxides.

(Seventh Step) Firing/Individualization of Laminate

Figure 6D:
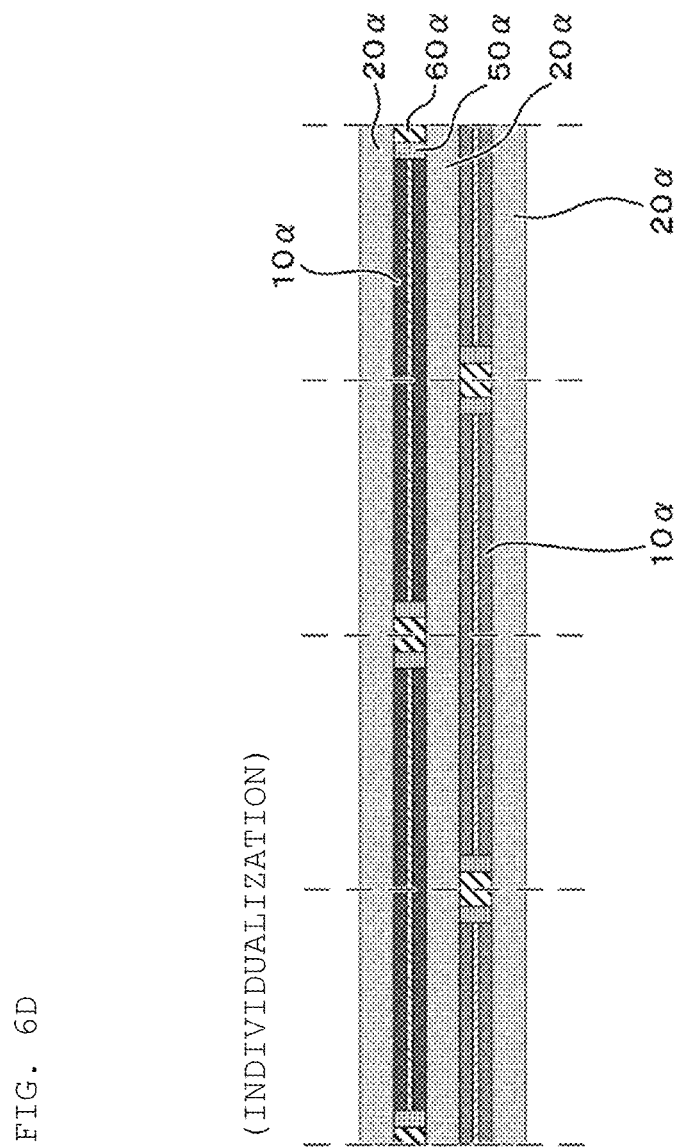
FIG. 6D is a schematic view illustrating a method for manufacturing a solid-state battery, that is, individualization according to one embodiment of the present invention.
Figure 7:
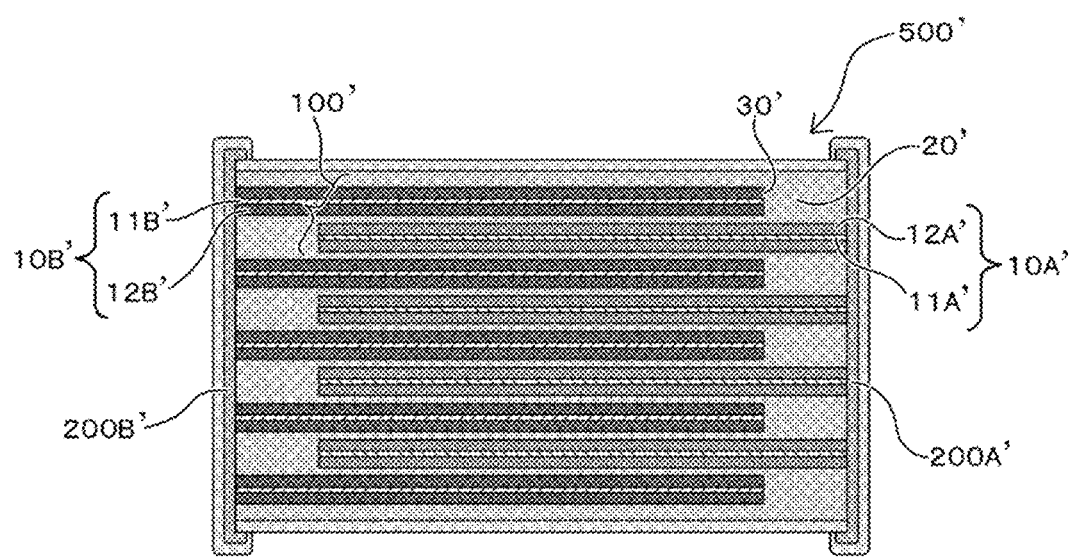
FIG. 7 is a cross-sectional view schematically illustrating a conventional solid-state battery.
Figure 8:
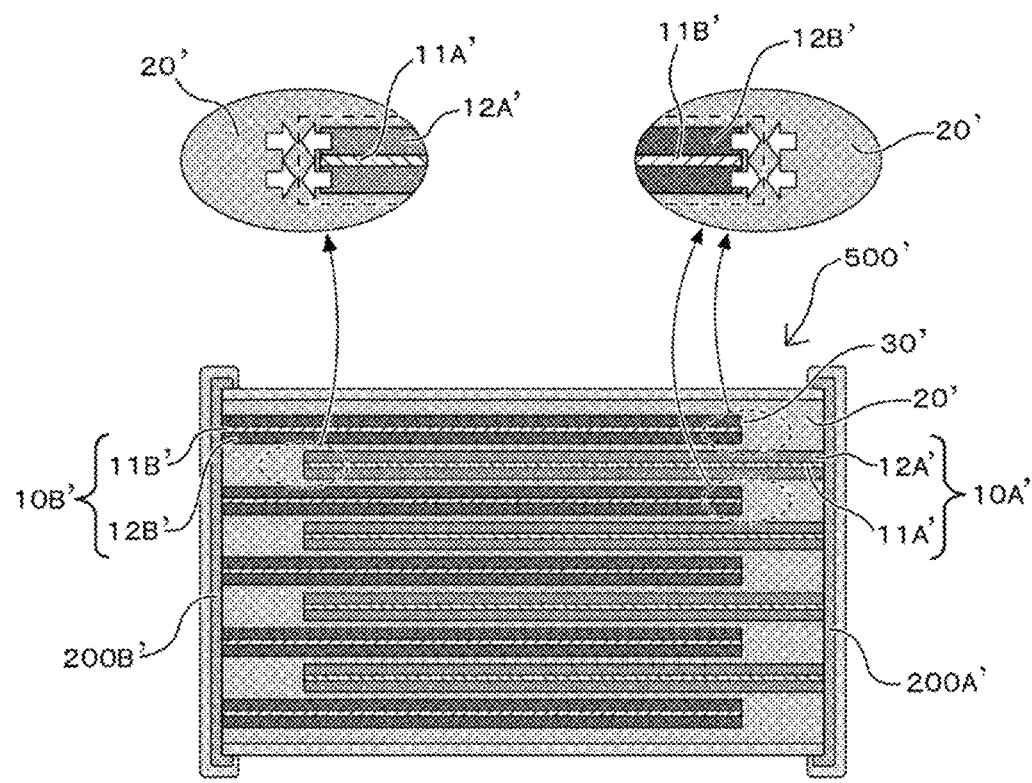
FIG. 8 is a cross-sectional view schematically illustrating a conventional solid-state battery having active material layers that expand during the charging.
Figure 9:
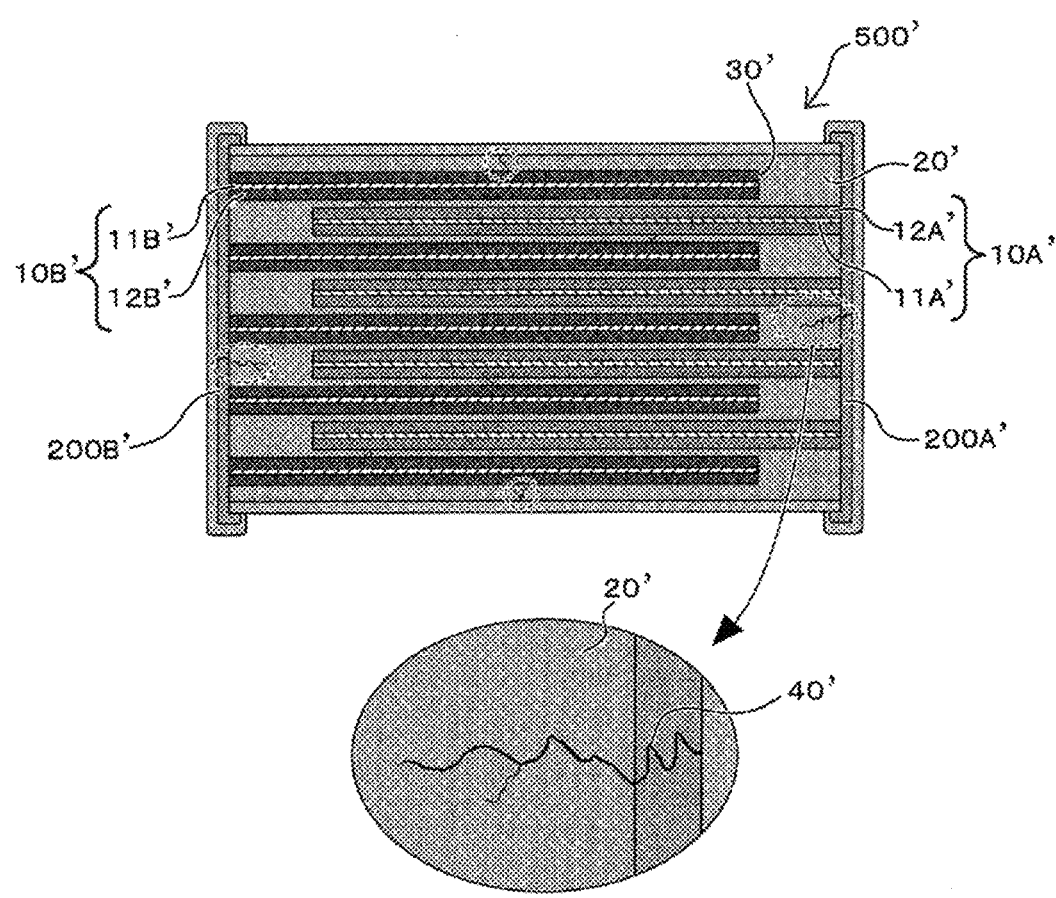
FIG. 9 is a cross-sectional view schematically illustrating a conventional solid-state battery including a solid electrolyte layer having cracks occurred during the charging.
Figure 10:
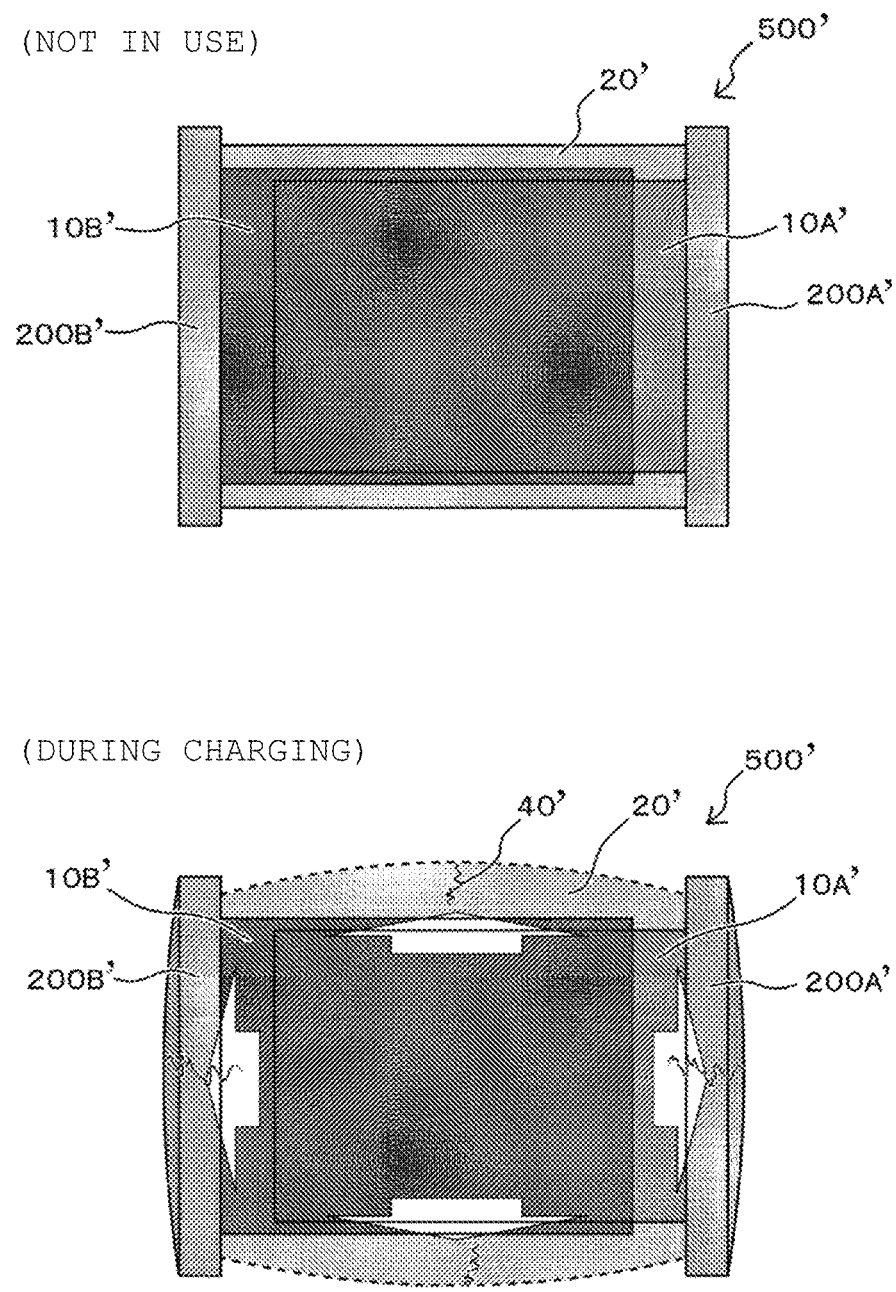
FIG. 10 is a plan view schematically illustrating a conventional solid-state battery including a solid electrolyte layer having cracks occurred during the charging.

Next, the obtained predetermined laminate is subjected to firing. The firing is performed by heating the laminate in a nitrogen gas atmosphere or in the atmosphere at 600° C. to 1000° C., for example. When the laminate is formed so that a plurality of components may be present in each layer, the laminate is individualized as necessary as shown in FIG. 6D.

(Eighth Step) Installation of Terminals

Finally, terminals are attached to the individualized laminate. Specifically, external terminals are attached by baking so as to be joined to the ends of the electrode layers exposed after firing. The external terminals at the positive electrode side and the negative electrode side are not necessarily formed after sintering of the laminate, and may be formed before firing and subjected to simultaneous sintering.

The external terminal at the positive electrode side can be formed by the application of a conductive paste to a side surface of the sintered laminate from which the positive electrode layer is exposed. Similarly, the external terminal at the negative electrode side can be formed by the application of a conductive paste to a side surface of the sintered laminate from which the negative electrode is exposed. It is preferable that the external terminals at the positive electrode side and the negative electrode side be provided so as to extend to the main surface of the sintered laminate because they can be connected to a mounting land in a small area in the next step. The component of the external terminal may be selected from at least one component selected from the group consisting of silver, gold, platinum, aluminum, copper, tin, and nickel.

The solid-state battery 500 according to one embodiment of the present invention can be properly manufactured as described above.

As described above, in the manufactured solid-state battery 500 according to one embodiment of the present invention, each of the electrode layers 10 is provided with the buffer portion 50 at or adjacent to the end 30 of the electrode layer 10, the buffer portion 50 having a density that is lower than the density of the active material layer 12 in portions other than the end of the electrode layer 10. During the charging and discharging of the solid-state battery 500, the presence of the buffer portion 50 makes it possible to relax the stress that is caused by the expansion of the active material layers 12 and may be generated at the solid electrolyte layer 20 that does not expand. In this respect, the manufactured solid-state battery 500 according to one embodiment of the present invention has technically unique characteristics.

One embodiment of the present invention has been described above, but the description merely illustrates a typical example of the scope of application of the present invention. Therefore, those skilled in the art will readily understand that the present invention is not limited to the above-mentioned embodiment, and various modifications may be made.

The solid-state battery according to one embodiment of the present invention can be used in various fields in which power storage is expected. The solid-state battery according to one embodiment of the present invention can be used in the electric/information/communication fields in which mobile devices and the like are used (for example, the field of mobile devices such as mobile phones, smartphones, smart watches, laptop computers and digital cameras, activity trackers, arm computers, and electronic paper), home/small industrial applications (for example, the field of power tools, golf carts, and home/nursing/industrial robots), large industrial applications (for example, the field of forklifts, elevators, and gulf cranes), the transportation systems field (for example, the field of hybrid vehicles, electric vehicles, buses, trains, electric assisted bicycles, electric motorcycles, and the like), power systems applications (for example, the field of power generation of various types, road conditioner, smart grids, general household power storage systems, and the like), medical applications (the field of medical equipment such as earphone hearing aids), pharmaceutical applications (the field of dose management systems and the like), the IoT field, space/deep sea applications (for example, the field of spacecraft, submersible research vessels, and the like), and the like although the above-mentioned applications are merely examples.

DESCRIPTION OF REFERENCE SYMBOLS

500, 500I, 500II, 500III, 500IV, 500V, 500VI, 500VII, 500': Solid-state battery
200A, 200A': Positive electrode terminal
200B, 200B': Negative electrode terminal
100, 100': Battery building block
10, 10I, 10II, 10III, 10IV, 10V, 10VI, 10VII: Electrode layer
10A, 10A': Positive electrode layer
10B, 10B': Negative electrode layer
10α: Electrode layer paste
10Aα: Positive electrode layer paste
10α: Negative electrode layer paste
11, 11I, 11II, 11III, 11IV, 11V, 11VI, 11VII, 11VII$_1$, 11VII$_2$, 11VII$_3$: Current collector layer
11A, 11A': Positive electrode current collector layer
11B, 11B': Negative electrode current collector layer
12, 12I, 12II, 12III, 12IV, 12V, 12VI, 12VII, 12VII$_1$, 12VII$_2$, 12VII$_3$: Active material layer
12A, 12A': Positive electrode active material layer 12B, 12B': Negative electrode active material layer 20, 20I, 20II, 20III, 20IV, 20V, 20VI, 20VII, 20': Solid electrolyte layer
Solid electrolyte paste: 20α
30, 30I, 30II, 30III, 30IV, 30V, 30VI, 30VII, 30': End of electrode
40': Cracks
50, 50I, 50II, 50III, 50IV, 50V, 50VI, 50VII, 50VII$_1$, 50VII$_2$, 50VII$_3$: Buffer portion
50α: Buffer portion paste
50α$_1$, 50α$_1$: Mixture
60, 60I, 60II, 60III, 60IV, 60V, 60VI, 60VII, 60VII$_1$, 60VII$_2$, 60VII$_3$: Insulating portion or solid electrolyte portion
60α: Solid electrolyte paste or insulating member paste
70α: Resin filler
80α: Support portion

The invention claimed is:

1. A solid-state battery comprising:
at least one battery building block including:
a positive electrode layer having a positive electrode active material layer;
a negative electrode layer having a negative electrode active material layer; and
a solid electrolyte layer interposed between the positive electrode layer and the negative electrode layer, the battery building block being provided in a stacking direction of layers in the solid-state battery,
the positive electrode layer having a first buffer portion at or adjacent to at least one end of the positive electrode layer, the first buffer portion having a density lower than a density of the positive active material layer in portions other than the at least one end of the positive electrode layer, and
the negative electrode layer having a second buffer portion at or adjacent to at least one end of the negative electrode layer, the second buffer portion having a density lower than a density of the negative active material layer in portions other than the at least one end of the negative electrode layer;
wherein at least one of the first buffer portion and the second buffer portion has a porous form.

2. The solid-state battery according to claim 1, wherein the at least one of the first buffer portion and the second buffer portion includes a porous active material member.

3. The solid-state battery according to claim 1, wherein the at least one of the first buffer portion and the second buffer portion includes a porous solid electrolyte member.

4. The solid-state battery according to claim 1, wherein the at least one of the first buffer portion and the second buffer portion includes a porous insulating member.

5. The solid-state battery according to claim 1, wherein both the first buffer portion and the second buffer portion have a porous form.

6. The solid-state battery according to claim 5, wherein both the first buffer portion and the second buffer portion include a porous active material member.

7. The solid-state battery according to claim 5, wherein both the first buffer portion and the second buffer portion include a porous solid electrolyte member.

8. The solid-state battery according to claim 5, wherein both the first buffer portion and the second buffer portion include a porous insulating member.

9. A solid-state battery comprising: at least one battery building block including:
a positive electrode layer having a positive electrode active material layer;
a negative electrode layer having a negative electrode active material layer; and
a solid electrolyte layer interposed between the positive electrode layer and the negative electrode layer, the battery building block being provided in a stacking direction of layers in the solid-state battery,
the positive electrode layer having a first buffer portion at or adjacent to at least one end of the positive electrode layer, the first buffer portion having a density lower than a density of the positive active material layer in portions other than the at least one end of the positive electrode layer, and
the negative electrode layer having a second buffer portion at or adjacent to at least one end of the negative electrode layer, the second buffer portion having a density lower than a density of the negative active material layer in portions other than the at least one end of the negative electrode layer,
further comprising an insulating portion adjacent to an end of the at least one of the first buffer portion and the second buffer portion.

10. The solid-state battery according to claim 9, wherein at least one of the first buffer portion and the second buffer portion is hollow.

11. The solid-state battery according to claim 9, wherein both the first buffer portion and the second buffer portion are hollow.

12. A solid-state battery comprising: at least one battery building block including:
a positive electrode layer having a positive electrode active material layer;
a negative electrode layer having a negative electrode active material layer; and
a solid electrolyte layer interposed between the positive electrode layer and the negative electrode layer, the battery building block being provided in a stacking direction of layers in the solid-state battery,
the positive electrode layer having a first buffer portion at or adjacent to at least one end of the positive electrode layer, the first buffer portion having a density lower than a density of the positive active material layer in portions other than the at least one end of the positive electrode layer, and
the negative electrode layer having a second buffer portion at or adjacent to at least one end of the negative electrode layer, the second buffer portion having a density lower than a density of the negative active material layer in portions other than the at least one end of the negative electrode layer,
further comprising:
a first insulating portion adjacent to an end of the first buffer portion; and
a second insulating portion adjacent to an end of the second buffer portion.

13. The solid-state battery according to claim 1, wherein the at least one of the first buffer portion and the second buffer portion is an active material-free portion.

14. The solid-state battery according to claim 1, wherein both the first buffer portion and the second buffer portion are active material-free portions.

15. The solid-state battery according to claim 1, wherein the positive electrode layer and the negative electrode layer are layers capable of storing and releasing lithium ions.

16. The solid-state battery according to claim 1, wherein the solid electrolyte layer is a layer capable of conducting lithium ions.

17. The solid-state battery according to claim 1, further comprising:
- a positive electrode terminal electrically connected to the positive electrode layer; and
- a negative electrode terminal electrically connected to the negative electrode terminal, wherein
- the first buffer portion and the positive electrode terminal surround the positive electrode layer in a plan view of the solid-state battery, and
- the second buffer portion and the negative electrode terminal surround the negative electrode layer in the plan view of the solid-state battery.

18. The solid-state battery according to claim 1, further comprising a solid electrolyte portion adjacent to an end of the at least one of the first buffer portion and the second buffer portion.

19. The solid-state battery according to claim 1, further comprising:
- a first solid electrolyte portion adjacent to an end of the first buffer portion; and
- a second solid electrolyte portion adjacent to an end of the second buffer portion.

\* \* \* \* \*